(12) United States Patent
Harp et al.

(10) Patent No.: US 8,990,715 B1
(45) Date of Patent: Mar. 24, 2015

(54) SYSTEMS AND METHODS FOR THE DESIGN AND USE OF VIRTUAL EMBLEMS

(75) Inventors: Derek R. Harp, San Mateo, CA (US); Bengt L. Gregory-Brown, Springfield, OH (US); Joseph P. Marfice, Pittsburgh, PA (US)

(73) Assignee: Maslow Six Entertainment, Inc., San Mateo, CA (US)

( * ) Notice: Subject to any disclaimer, the term of this patent is extended or adjusted under 35 U.S.C. 154(b) by 0 days.

(21) Appl. No.: 13/290,955

(22) Filed: Nov. 7, 2011

(51) Int. Cl.
- *G06F 3/048* (2013.01)
- *G06N 3/00* (2006.01)
- G06Q 30/06 (2012.01)

(52) U.S. Cl.
CPC ....... *G06F 3/048* (2013.01); *H04M 2203/1025* (2013.01); *G06N 3/006* (2013.01); *G06Q 30/0643* (2013.01); *A63F 2300/5553* (2013.01)
USPC .......................................... 715/763; 715/706

(58) Field of Classification Search
CPC .... G06F 3/048; G06N 3/006; G06Q 30/0643; A63F 2300/5553; H04M 2203/1025
USPC ................................. 715/763, 706
See application file for complete search history.

(56) References Cited

U.S. PATENT DOCUMENTS

| 7,468,729 B1 | 12/2008 | Levinson | 345/473 |
|---|---|---|---|
| 7,716,140 B1 | 5/2010 | Nielsen et al. | 705/319 |
| 7,733,232 B2 | 6/2010 | Light et al. | 340/573.1 |
| 8,226,485 B1 | 7/2012 | Mooney et al. | 463/42 |
| 8,255,807 B2 * | 8/2012 | Ganz et al. | 715/747 |
| 8,496,532 B1 | 7/2013 | Bethke et al. | 463/42 |
| 8,506,409 B2 | 8/2013 | Bethke et al. | 463/42 |
| 8,547,381 B2 | 10/2013 | Murphy | 345/474 |
| 8,574,076 B2 | 11/2013 | Mahajan et al. | 463/36 |
| 8,636,591 B1 | 1/2014 | Hawk et al. | 463/29 |
| 2002/0156866 A1 * | 10/2002 | Schneider | 709/218 |
| 2004/0128621 A1 * | 7/2004 | Orihara | 715/528 |
| 2006/0206827 A1 * | 9/2006 | DeWitt | 715/762 |
| 2006/0235790 A1 * | 10/2006 | Jung et al. | 705/39 |
| 2007/0136095 A1 * | 6/2007 | Weinstein | 705/2 |
| 2007/0220438 A1 * | 9/2007 | Okamoto et al. | 715/763 |
| 2007/0268299 A1 | 11/2007 | Jung et al. | 345/581 |
| 2008/0004116 A1 * | 1/2008 | Van Luchene et al. | 463/42 |
| 2008/0004118 A1 * | 1/2008 | Van Luchene et al. | 463/42 |
| 2008/0004119 A1 * | 1/2008 | Van Luchene et al. | 463/42 |
| 2008/0004120 A1 * | 1/2008 | Van Luchene et al. | 463/42 |
| 2008/0066020 A1 * | 3/2008 | Boss et al. | 715/968 |
| 2008/0270458 A1 | 10/2008 | Gvelesiani | 707/103 R |
| 2009/0040289 A1 | 2/2009 | Hetherington et al. | 348/14.12 |
| 2009/0106673 A1 | 4/2009 | Jung et al. | 715/757 |

(Continued)

OTHER PUBLICATIONS

Blizzard Entertainment, World of Warcraft Manual, 2004, pp. 1-208.*

(Continued)

*Primary Examiner* — Patrick Riegler
*Assistant Examiner* — Nicholas Klicos
(74) *Attorney, Agent, or Firm* — Pillsbury Winthrop Shaw Pittman LLP

(57) ABSTRACT

A virtual space may be provided to users. In views of the virtual space, avatars may represent users engaging in the virtual space. Individual avatars may be visually associated with emblems in view of the virtual space. Systems and methods to guide a user through the design of an emblem may include determinations whether an emblem under design is visually distinct from other emblems and/or compliant with a set of design rules for emblems.

29 Claims, 7 Drawing Sheets

(56) References Cited

U.S. PATENT DOCUMENTS

| | | | |
|---|---|---|---|
| 2009/0157495 A1* | 6/2009 | Cahuzac et al. ............... 705/14 |
| 2009/0158170 A1* | 6/2009 | Narayanan et al. ........... 715/753 |
| 2009/0164926 A1 | 6/2009 | Boyle et al. .................. 715/764 |
| 2009/0254859 A1* | 10/2009 | Arrasvuori et al. ........... 715/810 |
| 2009/0259648 A1 | 10/2009 | Bokor et al. ...................... 707/5 |
| 2009/0327054 A1 | 12/2009 | Yao et al. ......................... 705/12 |
| 2010/0057715 A1* | 3/2010 | Bates et al. ....................... 707/5 |
| 2010/0131864 A1* | 5/2010 | Bokor et al. .................. 715/757 |
| 2010/0138455 A1 | 6/2010 | Alewine et al. ............... 707/803 |
| 2010/0185640 A1* | 7/2010 | Dettinger et al. ............. 707/758 |
| 2010/0262572 A1* | 10/2010 | Cheng et al. .................... 706/47 |
| 2010/0312661 A1* | 12/2010 | Jung et al. ..................... 705/26.1 |
| 2011/0143834 A1 | 6/2011 | Guinn et al. .................... 463/25 |
| 2011/0212717 A1* | 9/2011 | Rhoads et al. ................. 455/420 |
| 2011/0244952 A1 | 10/2011 | Schueller et al. ............... 463/27 |
| 2011/0296324 A1* | 12/2011 | Goossens et al. ............. 715/763 |
| 2011/0310260 A1 | 12/2011 | Jordan et al. ............... 348/207.1 |
| 2012/0029987 A1* | 2/2012 | Kusumoto et al. ......... 705/14.16 |
| 2012/0034971 A1 | 2/2012 | Harp et al. ....................... 463/23 |
| 2012/0079046 A1 | 3/2012 | Murphy ......................... 709/206 |
| 2012/0131086 A1 | 5/2012 | Hoffman et al. .............. 703/202 |
| 2012/0221414 A1 | 8/2012 | Hetherington et al. .... 705/14.58 |
| 2012/0225723 A1 | 9/2012 | Webster et al. ................. 463/42 |
| 2013/0005473 A1 | 1/2013 | Bethke et al. ................... 463/42 |
| 2013/0005474 A1 | 1/2013 | Bethke et al. ................... 463/42 |
| 2013/0005480 A1 | 1/2013 | Bethke et al. ................... 463/42 |
| 2013/0006736 A1 | 1/2013 | Bethke et al. .............. 705/14.12 |
| 2013/0029735 A1 | 1/2013 | Hormigo Cebolla et al. .... 463/4 |
| 2013/0103760 A1 | 4/2013 | Golding et al. ............... 709/204 |
| 2013/0246929 A1 | 9/2013 | Hoffman et al. .............. 715/738 |
| 2014/0057725 A1 | 2/2014 | Mahajan et al. ................ 463/42 |

OTHER PUBLICATIONS

IQuickKillzl, "Black ops, perks equiment, weapons, emblem creator, and more", YouTube [online], uploaded on Sep. 11, 2010, [retrieved on Jan. 17, 2013]. Retrieved from the Internet <URL:http://www.youtube.com/watch?v=ujP6WotnQm0>. 08:49-11:39.*

Nolo.com, Inc., "How Federal Trademark Registration Works", Inc.com, accessed on Dec. 13, 2013, accessed from Internet via <http://www.inc.com/articles/1999/10/14646.html>, pp. 1-5.*

Notice of Allowance issued in U.S. Appl. No. 13/367,247, dated Dec. 5, 2014.

* cited by examiner

SYSTEMS AND METHODS FOR THE DESIGN AND USE OF VIRTUAL EMBLEMS

FIELD

The disclosure relates to systems and methods for the design and use of virtual emblems for users and/or avatars representing users in a virtual space.

BACKGROUND

Virtual spaces used to enable users to participate in games and/or other online activities are known. In some of these virtual spaces, avatars representing the users may be provided. Avatars used to represent users may include visual characteristics such that users within the virtual space may recognize a user by his avatar.

In some virtual spaces, users may select and/or alter their appearance to other users, e.g. by modifying their avatars. Traditionally, a particular user using a particular avatar in a first virtual space may be (visually) recognizable to other users in the first virtual space, though there may be doubt whether multiple users are using similar or substantially indistinguishable avatars. However, when the particular user uses a different avatar and/or engages in a different virtual space, e.g. for a new game, the particular user and/or his representative avatar would not (necessarily) be instantly recognizable to the other users.

SUMMARY

One aspect of the disclosure relates to systems and methods for providing a virtual space to users. In views of the virtual space, avatars may represent users as a game is being played and/or other activities are performed (collectively referred to herein as activities) by and/or among the users in the virtual space.

In some implementations, the system may include a server and client computing platforms that operate in a server/client configuration. View information of the virtual space may be transmitted and/or presented to the users on the client computing platforms. The client computing platforms may facilitate presentations of view of the virtual space. The users may be able to interact with the virtual space and/or participate in the activities through inputs to the client computing platforms. The server may be configured to execute one or more of a virtual space module, a design module, a design rule module, a distinctiveness module, a user account module, a registry module, and/or other modules.

The virtual space module may be configured to determine view information for transmissions to client computing platforms associated with users that facilitate presentation of views of a virtual space to the users on the client computing platforms. Some or all of the virtual space may be common among multiple users. The individual users may be represented in the virtual space by avatars in views of the virtual space. Individual ones of the avatars (and/or other representations of a user in the virtual space) may be visually associated with emblems. These emblems may be distinct, i.e. visually distinguishable from other emblems. Emblems may include a combination of graphics, text, and/or other design components that together serve the function, within the virtual space, of making the associated avatar and/or user distinguishable and/or recognizable to other users in the virtual space. The users may comprise a first user represented by a first avatar, a second user represented by a second avatar, and/or other users. The first avatar may be visually associated with a first emblem, the second avatar may be visually associated with a second emblem, and so on.

The virtual space module may be configured to render and/or implement the design of an emblem based on various considerations. The considerations may include characteristics of the client computing platform used to present the corresponding view information. For example, the number of available colors may be limited. In some implementations, one or more considerations may be based on a theme of the virtual space.

The design module may be configured to enable users to define emblems for presentation in the virtual space. The emblems may be designed by the users through design inputs received by the design module from the users. In some implementations, the design module may be configured to generate a design interface for presentation to individual users on the client computing platforms. The design interface may present an offered set of user-selectable design options for an emblem being defined by a user. The received design inputs may include one or more selections from the offered set of user-selectable design options. Alternatively, and/or simultaneously, the design interface may provide other ways for users to define emblems, guide the design of an emblem, and/or provide design choices from a set of choices, including, but not limited to, textual input, design descriptions, providing existing designs and/or other graphics to reverse-engineer a design, mash-up a plurality of existing designs and/or graphics, and/or other ways for users to define emblems, guide the design of an emblem, and/or provide other ways for users to define emblems.

The design rule module may be configured to determine whether emblems being defined by users in a virtual space, e.g. through the design module, are in compliance with a set of design rules for emblems. Such an emblem may be referred to as an emblem under design. The set of design rules may include rules pertaining to allowed and/or disallowed color combinations, spatial arrangement of one or more objects included in the emblem under design, one or more divisions of one or more components of the emblem under design, and/or pertaining to other design rules.

The distinctiveness module may be configured to determine whether emblems under design, e.g. through the design module, are visually distinct from a set of designs of emblems. Distinctiveness as described herein may relate to design differences, and may not relate to implementation differences. For example, two depictions of a bear standing erect with forepaws raised may be considered not visually distinct, regardless of the respective artist's depiction of the bear's forepaws or claws. Such a bear may, however, be considered visually distinct from a depiction of a sleeping bear. Design differences may relate to visual characteristics that can be reliably distinguished from other, possibly similar, visual characteristics. In some implementations, the distinctiveness module may be configured to determine whether an emblem under design is visually distinct from a set of designs of emblems based on at least a predetermined number of design differences (with any design from the set of designs of emblems). The required predetermined number of design differences may be determined by the designers, operators, and/or other stakeholders involved in operating the virtual space.

The user account module may be configured to manage user accounts including account information of users. Individual user accounts may be associated with individual users in the virtual space. Individual ones of the avatars may be based on account information of an individual user account.

The registry module may be configured to manage access to information included in one or more sets of designs for emblems. For example, a set of designs of emblems may correspond to users of (at least part of) the same virtual space. Alternatively, and/or simultaneously, a set of designs for emblems may correspond to users of (at least part of) multiple virtual spaces, which may be correlated in some way. For example, the multiple virtual spaces may be part of the same franchise of virtual video games, the same publisher, the same designer, a similar theme, and/or may be substantially unrelated.

The virtual space module may be further configured such that, responsive to a determination that an emblem under design by a particular user is visually distinct from a set of designs of emblems, and/or a determination that the emblem under design is in compliance with a set of design rules for emblems, the emblem may be visually associated with the particular user and/or his avatar in views of the virtual space. Information regarding such an association may be shared with, accessible via, and/or stored by or through the registry module.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
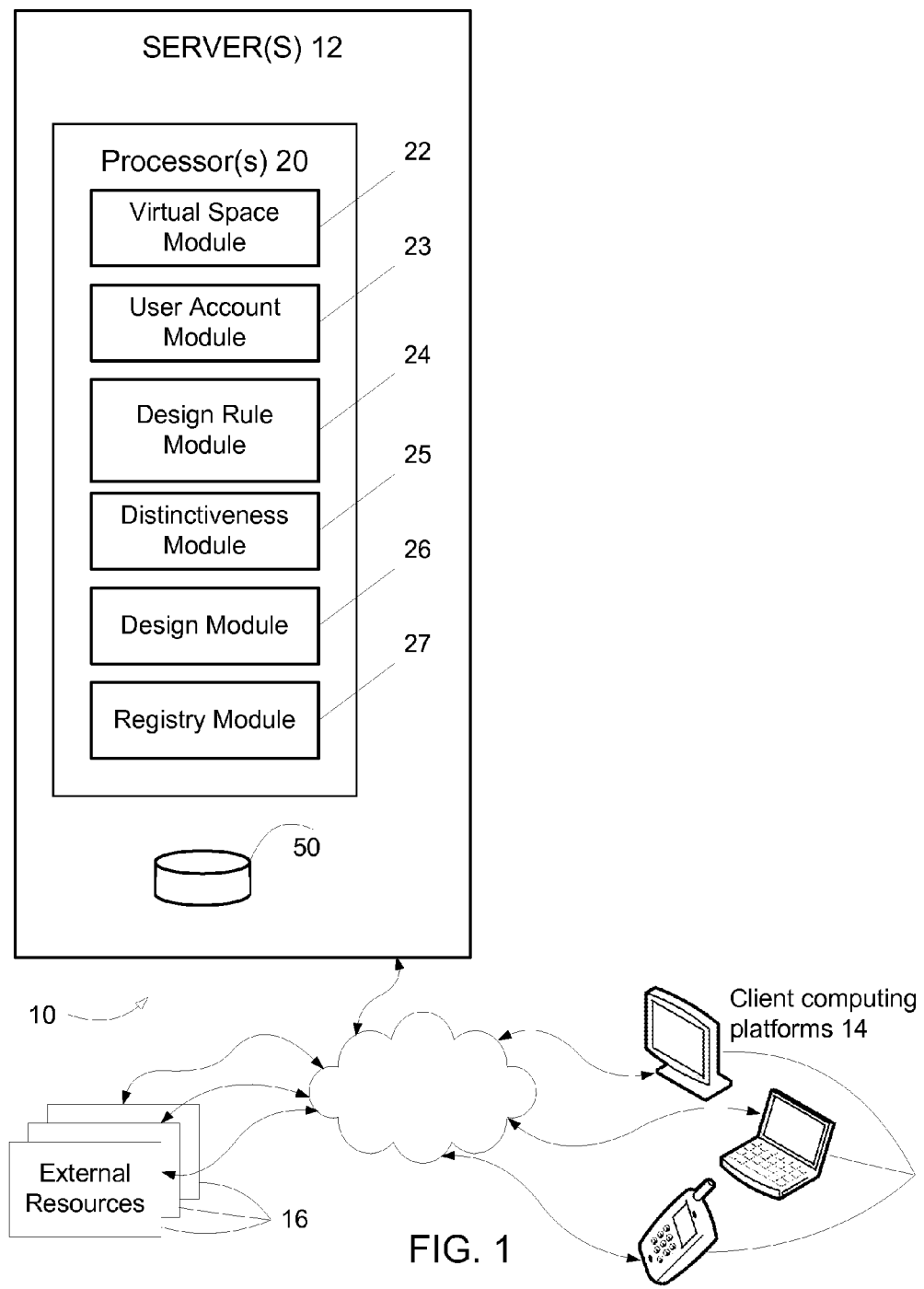
FIG. 1 illustrates a system configured to guide the design emblems for users in a virtual space.

FIG. 1 illustrates a system 10 configured to provide a virtual space to users. System 10 may be configured such that the users participate in a game within the virtual space. System 10 may be configured to determine view information for transmissions to one or more client computing platforms 14 associated with users engaging in the virtual space. Some or all of the virtual space may be common among multiple users. Providing the virtual space may include hosting the virtual space over a network.

In some implementations, system 10 may include one or more servers 12. Server 12 may be configured to communicate with one or more client computing platforms 14 according to a client/server architecture, and/or according to another suitable architecture. The users may access system 10 and/or the virtual space via client computing platforms 14.

In some implementations, system 10 may include one or more external resources 16. External resource 16 may include sources of information, hosts, and/or providers of external virtual spaces, external entities participating in the virtual space, and/or other resources.

Server 12 of system 10 in FIG. 1 may be configured to execute one or more computer program modules, through one or more processors 20. The computer program modules may include one or more of a virtual space module 22, a user account module 23, a design rule module 24, a distinctiveness module 25, a design module 26, a registry module 27, and/or other modules.

Virtual space module 22 of system 10 in FIG. 1 may be configured to provide one or more virtual spaces to users via client computing platforms 14. As used herein, a "virtual space" may include a virtual world and/or space, a virtual environment, one or more interactive, electronic social media, and/or other virtual communities, or a combination thereof. A virtual space may refer to a virtual space in which a game is being played that involves a plurality of users. Providing a virtual space to users may include executing one or more instances of a virtual space, determining view information representing the virtual space (e.g., from the instance(s)) for the users (e.g., individually and/or collectively), transmitting the view information to the client computing platforms 14 associated with the users to facilitate views of the virtual space being presented to the users, and/or other activities.

A virtual space may comprise a simulated space that is accessible by users via clients (e.g., client computing platforms 14) that present the views of the virtual space to a user. The simulated space may have a simulated physical layout, express ongoing real-time interaction by one or more users and/or non-player characters (NPCs), and/or be constrained by simulated physics that governs interactions between virtual objects in the simulated space. In some instances, the simulated physical layout may be a 2-dimensional layout. In some instances, the simulated physical layout may be a 3-dimensional layout.

Virtual space module 22 may be configured to express the virtual space in a relatively limited manner. For example, views of the virtual space presented to the users may be selected from a limited set of graphics depicting an event in a given place within the virtual space. The views may include additional content (e.g., text, audio, pre-stored video content, movable icons, avatars, and/or other content) that describes particulars of the current state of the space, beyond the relatively generic graphics. Icons representing game components (e.g., game pieces, weapons, animals, playing cards, dice, and/or other game components) may change and/or move within the views of the virtual space to depict a game being played within the virtual space. Such limited representation of the virtual space may reduce the cost of hosting the virtual space in terms of processing, storage, communication bandwidth, and/or other computing resource (e.g., on server 12 and/or client computing platforms 14). Other expressions of individual places within the virtual space are contemplated.

Within the instance(s) of the virtual space (or other virtual space) executed by virtual space module 16, users may control avatars to interact with the virtual space and/or each other. As used herein, the term "avatar" may refer to an object (or group of objects), e.g. present in the virtual space, that represents an individual user. Individual users may be represented in the virtual space by avatars in the views of the virtual space. For example, an avatar may be an anthropomorphic character, and/or another character. The avatar may be controlled by the user with which the avatar is associated. While a game is being played within the virtual space, the avatars may be positioned at different and/or various locations within the virtual space and/or views thereof. The avatar representing a given user may be created and/or customized by the given user. The user may have an "inventory" of virtual goods and/or currency that the user can use (e.g., by manipulation of an avatar or other user controlled element, and/or other items), display, gift, and/or otherwise interact with within the virtual space.

The users may participate in the virtual space by controlling one or more of the available user controlled elements in the virtual space (e.g., game elements, avatars, and/or other elements). Control may be exercised through control inputs and/or commands input by the users through client computing platforms 14.

Individual ones of the avatars (and/or other representations of a user in the virtual space) may be visually associated with distinct emblems. Emblems may include a combination of graphics, text, and/or other design components that together serve the function, within the virtual space, of making the associated avatar and/or user (possibly uniquely) recognizable to other users in the virtual space. The users may comprise a first user represented by a first avatar, a second user represented by a second avatar, and/or other users. The first avatar may be visually associated with a first emblem, the second avatar may be visually associated with a second emblem, and so on. The design of emblems may be restricted, e.g. by design rules, design guidelines, design templates, and/or other restrictions (collectively referred to herein as "design rules") to provide consistency and/or recognizability. For example, assume that an implementation of system 10 for a particular virtual space may enable a textual component, such as, e.g., a maxim, in the design of the emblems. A design of an emblem may be restricted, e.g., by a maximum number of characters, types of available fonts, spatial arrangement of the text within the design, such as "centered at the bottom of the emblem", and/or other restrictions. The design may be restricted, e.g., from having the textual component arranged at or near the top of the design.

Virtual space module 22 may be configured to render and/or implement the design of an emblem based on various considerations. The considerations may include characteristics of the client computing platform used to present the corresponding view information. For example, the number of available pixels and/or colors may be limited. In some implementations, one or more considerations may be based on a theme of the virtual space. Such considerations may limit, reduce, and/or prevent certain anachronisms. For example, in some implementations, virtual space module 22 may be configured to implement a design of an emblem based on a theme of a virtual space. As an example, a design for a western-style game using a horse may be converted and/or implemented as a design for a racing-style game using a motorcycle, and/or vice versa. Generally, designs may be thus be transferred between virtual spaces. In some implementations, the contents and design of an emblem may influence game play. For example, an NPC may take umbrage at the public display of a particular object or item within an emblem, and/or at an anachronism or other mismatch at display in an emblem.

A virtual space may be integrated in, combined with, or otherwise operating in some coordinated manner with interactive, electronic social media, including one or more of a social network, a micro-blogging service, a blog service (or host), a browser-based game, a multi-player mobile game, a file (e.g., image file, video file, and/or other files) sharing service, a messaging service, a message board, a forum, and/or other electronically distributed media that are scalable and enable interaction between the users. As was the case with virtual spaces, in some implementations, users of interactive, electronic social media may be represented within interactive, electronic social media by avatars. An avatar representing a given user may be presented in views of the interactive, electronic social media as being associated with content that may be provided by the given user, directed by the given user, related to the given user, and/or associated with the given user in other ways. Some non-limiting specific examples of interactive, electronic social media may include the micro-blogging service provided by Twitter™, the social network provided by Facebook™, the social network provided by MySpace™, the social network provided by Foursquare®, the virtual world provided by SecondLife®, the massively multi-player online game provided by World of Warcraft®, the file sharing service provided by Flickr®, Blogger, YouTube, PlayStation® Home, Xbox® Live, and/or other interactive electronic social media. It is contemplated that the use of emblems may be incorporated within interactive, electronic social media, e.g. in conjunction with avatars used therein.

Virtual space module 22 may be configured to manage one or more games being played by the users within the virtual space. Managing a game may include one or more of determining score, assessing success and/or failure (e.g., of individual actions, sets, of actions, matches, game events within an individual match, and/or other episodes), determining random or pseudo-random game parameters, and/or other game management functions. Managing a game may include accepting input in the form of user selections and/or actions (e.g., input at client computing platforms 14), output from one or more random (or pseudo-random) number generators, rules and/or settings governing one or more game mechanics of the game, and/or other inputs. Managing a game may include determining outputs, e.g. in the form of scores (e.g., of individual actions, sets of actions, achievements, victories, missions accomplished, treasures retrieved, matches played/won, game events within an individual match/mission, and/or other scores), winners and/or losers, required actions to be performed by the users, and/or other outputs.

It will be appreciated that the description herein of virtual space module 22 providing a virtual space to a set of users in which a game may be played by the set of users is not intended to be limiting. For example, virtual space module 22 may be configured to provide a plurality of different virtual spaces to a plurality of different sets of users. The individual sets of users may be participating in different instances of the game within the individual virtual spaces. The concepts described herein with respect to the individual virtual space and/or game should be extendible to implementations in which a plurality of different virtual spaces are being used to conduct a plurality of different instances of the game (e.g., between different sets of users).

Design module 26 of system 10 in FIG. 1 may be configured to enable users to define emblems for presentation in the virtual space. The emblems may be designed by the users by design inputs received by the design module from the users. In some implementations, design module 26 may be configured to generate a design interface for presentation to individual users on the client computing platforms. The design interface may present an offered set of user-selectable design options for an emblem being defined by a user. The design inputs received through the design interface may include one or more selections from the offered set of user-selectable design options. Alternatively, and/or simultaneously, design module 26 may provide other ways for users to define emblems, guide the design of an emblem, and/or provide design choices from a set of choices, including, but not limited to, textual input, input of textual and/or graphical design descriptions, providing existing designs and/or other graphics to reverse-engineer a design, providing a plurality of existing designs and/or graphics to mash-up and/or combine into a new design, and/or other ways for users to define emblems, guide the design of an emblem, and/or provide other ways for users to define emblems. The operation of design module 26 may be configurable and/or updateable before, during, and/or after deployment of system 10 and/or the virtual space. For example, the offered set of user-selectable design options may be updated after a game is released, e.g. in response to the design, by one or more users in that game or another virtual space, of possibly and/or intentionally offensive emblems.

Figure 2:
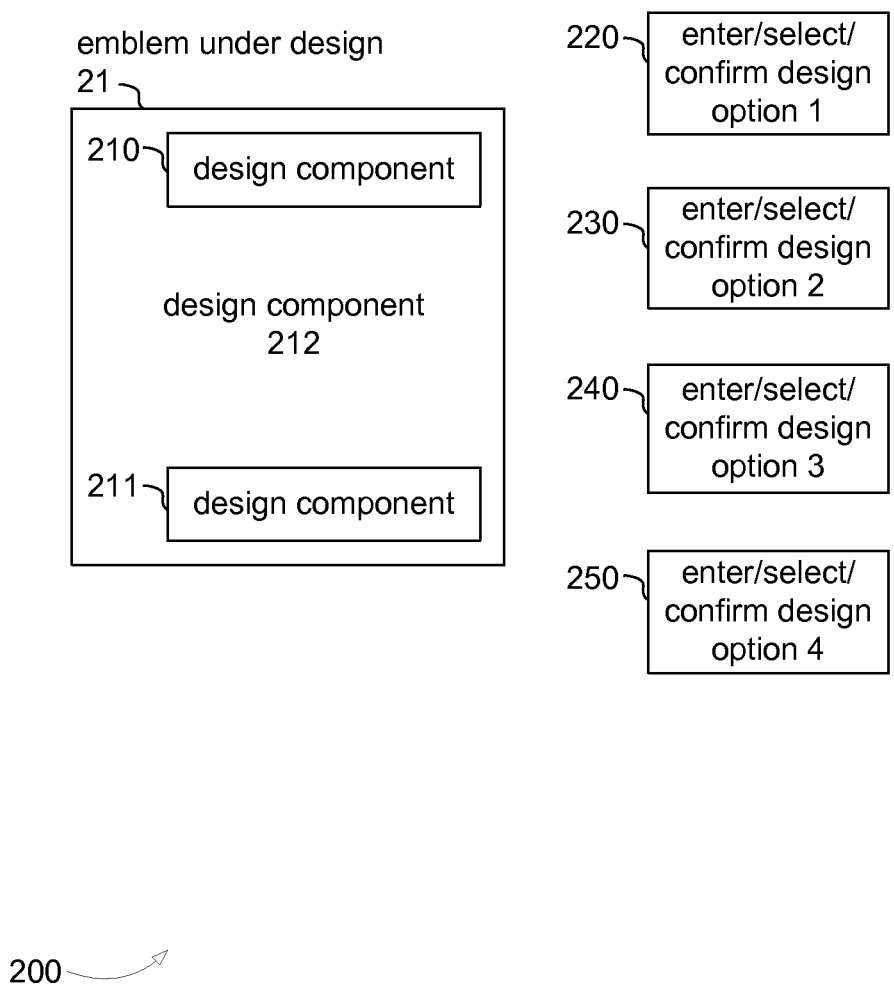
FIG. 2 illustrates a view of a design interface for the design of emblems, in accordance with one or more implementations.

By way of illustration, FIG. 2 illustrates a view of a design interface 200 for the design of emblems, such as may be generated by design module 26. A current emblem under design 21 (hereinafter "emblem 21") is being defined by a user. Emblem 21 may be a preview of the current emblem being designed, incorporating and/or representing the current set of selected design-options that have been received from a user. Emblems may follow one or more design templates having one or more sets of restrictions. Design templates may designate particular spatially arranged areas of an emblem, such as, e.g., the bottom right quadrant, the periphery of the emblem, the top one-third of the emblem, and/or other designated areas, for a particular set of one or more design components. Restrictions and other design rules may pertain specifically to one or more designated areas. As depicted in FIG. 2, emblem 21 in design interface 200 includes three designated areas: design component 210, design component 211, and design component 212. Design component 210 may be a designated area near the top of emblem 21. Design component 211 may be a designated area near the bottom of emblem 21. Design component 212 may be a designated area including the center of emblem 21. Elements of design interface 200 may be implemented as fields configured to receive entry, selection, and/or confirmation from a user. The fields may include one or more of a text entry field, a set of selectable menu items, a selectable field, and/or other fields configured to receive entry, selection, and/or confirmation from a user.

For example, design interface 200 in FIG. 2 includes fields 220, 230, 240, 250 that may pertain to one or more design options for emblem 21. The number of (user-selectable) fields depicted in FIG. 2 is meant to be exemplary, and not limiting in any way. For example, field 220 may be related to a selection of the shape of emblem 21, and/or of one or more design components of emblem 21, such as, e.g., design component 210 near the top of emblem 21. Once a selection has been made and/or confirmed, the view of emblem 21 may reflect the selected design option. Field 230, for example, may be related to a selection of one or more colors, such as, e.g., background colors, for one or more design components of emblem 21, such as, e.g., design component 212, which includes the center of emblem 21. Field 240, for example, may be related to a selection of one or more objects, characters, and/or items to be arranged in or near one or more design components of emblem, such as, e.g., an image of an animal to be arranged as design component 211 near the bottom of emblem 21. Field 250, for example, may be related to the selection offered through another field, such as, e.g., field 240. Assume for example that a user has selected, through field 240, to arrange two bears as design component 211 near the bottom of emblem 21. Field 250 may now be used, for example, to select a particular position of the two bears, including, e.g., bears standing erects with forepaws raised, sleeping bears, and/or other available and/or appropriate positions in relation to the selection through field 240.

In some implementations, the offered and/or available design options, such as, e.g., the design options offered through fields 220, 230, 240, and 250 in FIG. 2, may be based on either game-wide considerations that may apply to all users in a particular virtual space, or user-specific considerations. For example, game-wide considerations may pertain to a theme of the virtual space, such as, e.g., pre-historic times, biblical times, medieval times, Victorian times, futuristic sci-fi times, and/or other themes. Such game-wide considerations may pose restrictions on the available objects, characters, and/or items, on the available color palettes, and/or other restrictions. User-specific considerations may pertain to account information and/or avatar-related information of a particular user. For example, a user may have selected a particular race, tribe, people, species, alliance, and/or group of available choices as part of the way the user represents himself within the virtual space. For example, sea-based creatures may select from a different set of available objects, characters, and/or items than land-based creatures. For example, elves may use a different color palette than trolls, and so forth. Note that any available design options, game-wide and user-specific considerations and/or restrictions described herein may be configurable and/or updateable before, during, and/or after deployment of system 10 and/or the virtual space.

Note that the foregoing examples are merely intended to be exemplary, and not limiting in any way. The use, spatial arrangement, and described functionality of the four user-selectable fields in design interface 200 is likewise exemplary, and not limiting in any way. Any of the preceding functions described through particular user-selectable fields in design interface 200 may be attributed to other elements of a design interface.

Design rule module 24 of system 10 in FIG. 1 may be configured to determine whether emblems being defined by users in a virtual space, e.g. through design module 26, are in compliance with a set of design rules for emblems. Such an emblem may be referred to as an emblem under design. The set of design rules may include rules pertaining to allowed and/or disallowed color combinations, spatial arrangement of one or more objects included in the emblem under design, one or more divisions of the emblem under design or one or more components of the emblem under design, and/or pertaining to other design rules. In some implementations, one or more design rules may be based on game-wide considerations, such as, e.g., the theme of the virtual space, and/or user-specific considerations, such as, e.g., account information of a particular user. For example, elves may use a different color palette than trolls, and so forth. The functionality of design rule module 24 may be integrated in a design interface, such as design interface 200 in FIG. 2. For example, the available design options through user-selectable fields 220, 230, 240, and/or 250 may be restricted based on one or more design rules, e.g. under control of design rule module 24.

Figure 3A:
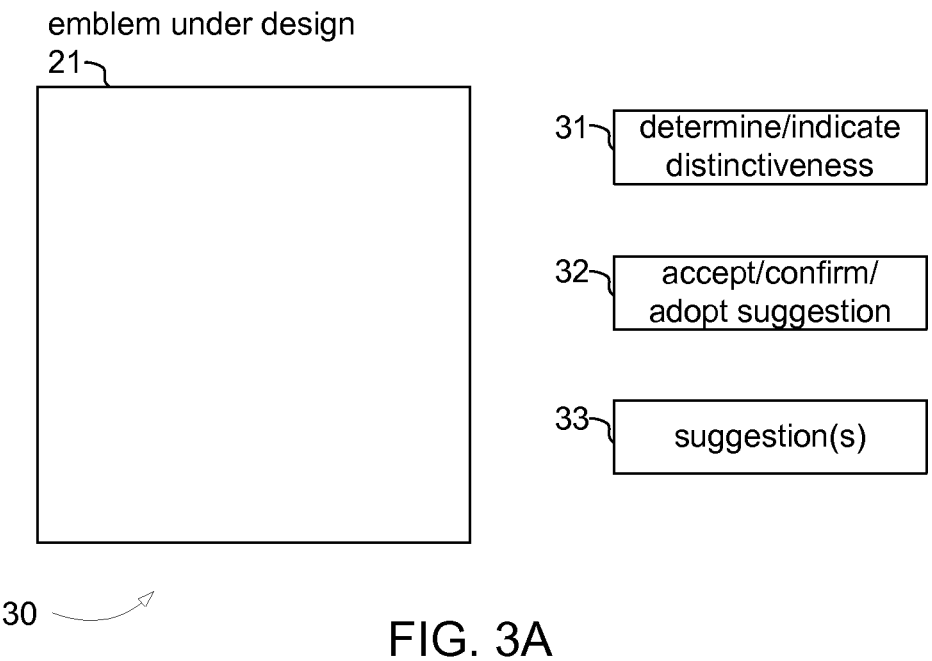
FIGS. 3A-3B illustrate views of design interfaces used when designing emblems, in accordance with one or more implementations.
Figure 3B:
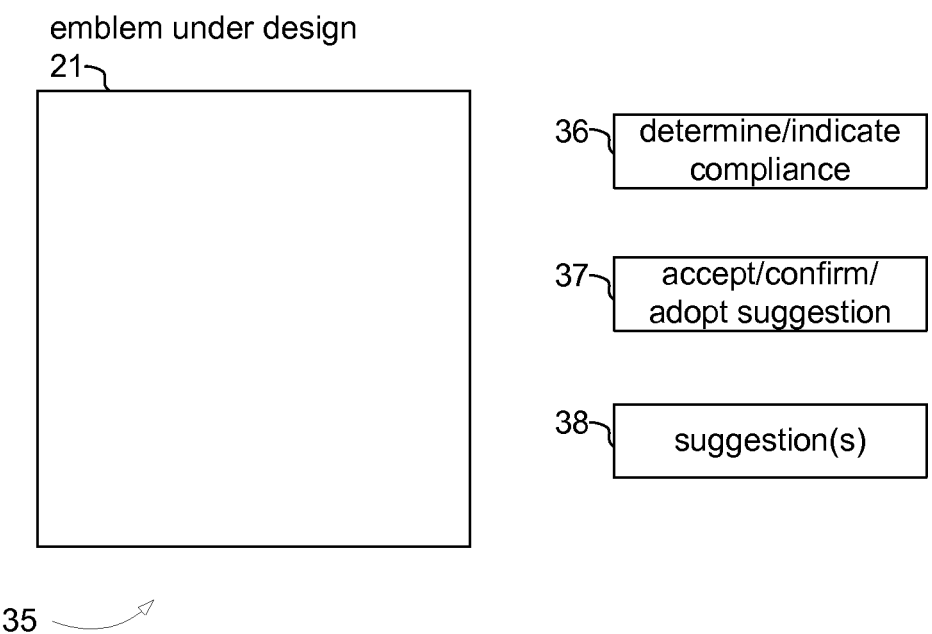

By way of illustration, FIG. 3B illustrates a view of a design interface 35 that may be used when designing emblems. As before, current emblem under design 21 is being defined by a user. Emblem 21 may be a preview of the current emblem being designed, incorporating and/or representing the current set of selected design-options that have been received from a user. Elements of design interface 35 may be implemented as fields configured to receive entry, selection, and/or confirmation from a user. The fields may include one or more of a text entry field, a set of selectable menu items, a selectable field, and/or other fields configured to receive entry, selection, and/or confirmation from a user. For example, design interface 35 in FIG. 3B includes fields 36, 37, and 38 that may pertain to one or more design options for emblem 21. The number of (user-selectable) fields depicted in FIG. 3B is meant to be exemplary, and not limiting in any way. For example, field 36 may be selected to initiate operation of design rule module 24. Alternatively, field 36 may be used to present an indicator to the user, wherein the indicator indicates whether emblem 21, in its current state of design, is determined to be, e.g. by design rule module 24, in compliance with one or more design rules. Presenting real-time feedback regarding the compliance of a design of an emblem may improve the user's experience of designing an emblem. As an example, assume emblem 21 includes a golden sleeping bear on a white background. Field 36 may indicate this design is not in compliance with design rules related to color contrast. For example, field 38 may pertain to one or more suggested design options, e.g. as determined by design rule module 24, that, if adopted and/or confirmed by the user, would cause emblem 21 to be in compliance with one or more design rules, such as, e.g., the same set of design rules used in relation to field 36. In the given example, field 38 may include a design suggestion to change the background color to green. For example, field 37 may be used to accept, adopt, and/or confirm the currently selected design options, which may include one or more suggested design options through field 38. Note that any available and/or suggested design options, game-wide and user-specific considerations and/or restrictions described herein may be configurable and/or updateable before, during, and/or after deployment of system 10 and/or the virtual space.

Note that the foregoing examples are merely intended to be exemplary, and not limiting in any way. The use, spatial arrangement, and described functionality of the three fields in design interface 35 is likewise exemplary, and not limiting in any way. Any of the preceding functions described through particular fields in design interface 35 may be attributed to other elements of a design interface. For example, design interface 35 may be combined and/or integrated with design interface 200 of FIG. 2.

In some implementations, design rule module 24 may be configured to determine whether an emblem under design is likely to be inoffensive. Rules and/or definitions of offensive emblems may be game-specific and/or specific to a virtual space, and may be configurable and/or updateable before, during, and/or after deployment of system 10 and/or the virtual space. For example, user, designers, and/or operators of some virtual spaces may consider religious iconography and/or symbolism to be potentially offensive, and attempt to restrict emblems from including them. In some implementations, design rule module 24 may be configured to determine suggested design options that, if adopted by the user, would cause the emblem under design to no longer be not likely to be inoffensive.

Distinctiveness module 25 of system 10 in FIG. 1 may be configured to determine whether emblems under design, e.g. through the design module, are visually distinct from a set of designs of emblems. Distinctiveness as described herein may relate to design differences, and may not relate to implementation differences. For example, two depictions of a bear standing erect with forepaws raised may be considered not visually distinct, regardless of the respective artist's depiction of the bear's forepaws or claws. Such a bear may, however, be considered visually distinct from a depiction of a sleeping bear. Design differences may relate to visual characteristics that can be reliably distinguished from other, possibly similar, visual characteristics. In some implementations, the set of designs of emblems may correspond to emblems used in one, two, or more than two distinct virtual spaces. In some implementations, the set of designs may correspond to all emblems used in a particular virtual space, with the possible exception of a designated set of users and/or non-player characters who may, for example, have the ability to impersonate and/or copy other users, their avatars, and/or their emblems.

Access to information included in a set of designs of emblems may be managed by and/or through registry module 27. For example, registry module 27 may manage a database of finalized and/or confirmed designs of emblems for one or more virtual spaces.

In some implementations, distinctiveness module 25 may be configured to determine whether an emblem under design is visually distinct from a set of designs of emblems based on at least a predetermined number of design differences (with any design in the set of designs). This may reduce confusion and/or improve recognizability of emblems. The required predetermined number of design differences may be determined by the designers, operators, and/or other stakeholders involved in operating the virtual space. In some embodiments, the predetermined number of required design differences may be two. In some embodiments, the predetermined number of design differences may be three. These are exemplary numbers of required design differences, and are not meant to be limiting in any way. The predetermined number of design differences may be one or more.

The functionality of distinctiveness module 25 may be integrated in a design interface, such as design interface 200 in FIG. 2.

By way of illustration, FIG. 3A illustrates a view of a design interface 30 that may be used when designing emblems. As before, current emblem under design 21 is being defined by a user. Emblem 21 may be a preview of the current emblem being designed, incorporating and/or representing the current set of selected design-options that have been received from a user. Elements of design interface 30 may be implemented as fields configured to receive entry, selection, and/or confirmation from a user. The fields may include one or more of a text entry field, a set of selectable menu items, a selectable field, and/or other fields configured to receive entry, selection, and/or confirmation from a user. For example, design interface 30 in FIG. 3A includes fields 31, 32, and 33 that may pertain to one or more design options for emblem 21. The number of fields depicted in FIG. 3A is meant to be exemplary, and not limiting in any way. For example, field 31 may be selected to initiate operation of distinctiveness module 25. Alternatively, field 31 may be used to present an indicator to the user, wherein the indicator indicates whether emblem 21, in its current state of design, is determined to be, e.g. by distinctiveness module 24, visually distinct from a set of designs of emblems. Presenting real-time feedback regarding the distinctiveness of a design of an emblem may improve the user's experience of designing an emblem. For example, field 33 may pertain to one or more suggested design options, e.g. as determined by distinctiveness module 25, that, if adopted and/or confirmed by the user, would cause emblem 21 to be visually distinct from a set of designs of emblems, such as, e.g., the same set of designs of emblems used in relation to field 31. For example, field 32 may be used to accept, adopt, and/or confirm the currently selected design options, which may include one or more suggested design options through field 33. Note that any available and/or suggested design options, game-wide and user-specific considerations and/or restrictions described herein may be configurable and/or updateable before, during, and/or after deployment of system 10 and/or the virtual space.

Note that the foregoing examples are merely intended to be exemplary, and not limiting in any way. The use, spatial arrangement, and described functionality of the three fields in design interface 30 is likewise exemplary, and not limiting in any way. Any of the preceding functions described through particular fields in design interface 30 may be attributed to other elements of a design interface. For example, design interface 30 may be combined and/or integrated with design interface 200 of FIG. 2.

User account module 23 of system 10 in FIG. 1 may be configured to manage user accounts including account information of users. Individual user accounts may be associated with individual users in the virtual space. Individual ones of the avatars may be based on account information of an individual user account. For example, the account information of a particular user may include information regarding a user-specific selection of a particular race, tribe, people, species, alliance, and/or group of available choices as part of the way the particular user represents himself within the virtual space. User-specific account information may affect the operation of other computer program modules. For example, one or more design rules used by design rule module 24 may be based on a particular user's account information. For example, elves may use a different color palette than trolls, and so forth.

Registry module 27 of system 10 in FIG. 1 may be configured to manage access to information included in one or more sets of designs for emblems. For example, a set of designs of emblems may correspond to users of (at least part of) the same virtual space. Alternatively, and/or simultaneously, a set of designs for emblems may correspond to users of (at least part of) multiple virtual spaces, which may be correlated in some way. For example, the multiple virtual spaces may be part of the same franchise of virtual video games, the same publisher, the same designer, a similar theme, and/or may be substantially unrelated. In some implementations, registry module 27 may manage (access to) a database of finalized and/or confirmed designs of emblems for one or more virtual spaces.

Virtual space module 22 may be further configured such that, responsive to a determination that an emblem under design by a particular user is visually distinct from a set of designs of emblems (e.g., by distinctiveness module 25), and/or a determination that the emblem under design is in compliance with a set of design rules for emblems (e.g., by design rule module 24), the emblem may be visually associated with the particular user and/or his avatar in views of the virtual space. Information regarding such an association may be shared with, accessible via, and/or stored by or through registry module 27.

Figure 4:
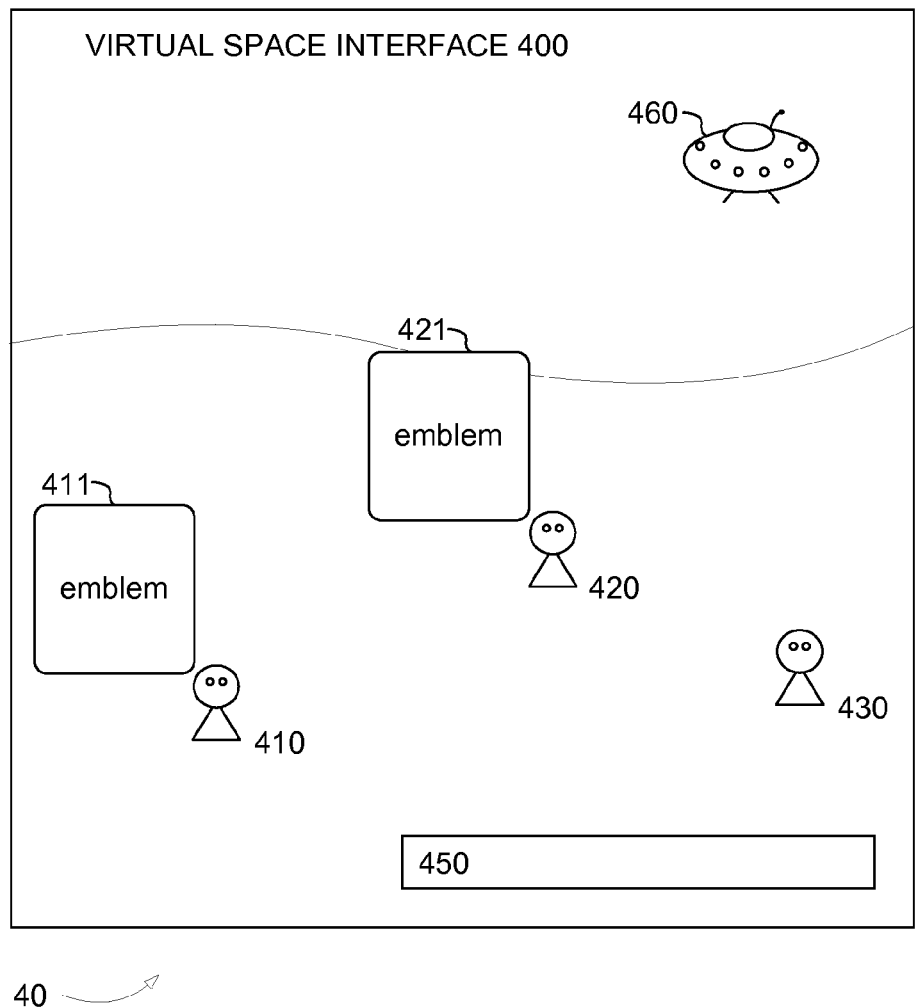
FIG. 4 illustrates an exemplary virtual space interface in accordance with one or more implementations.

By way of illustration, FIG. 4 illustrates a view 40 of a virtual space interface 400. View 40 may include a first avatar 410, a second avatar 420, a third avatar 430, game-wide interface element 450, user-specific interface element 460, and/or other components or features. Game-wide interface element 450 may, e.g., be an object and/or a character that multiple users of the virtual world may interact with. User-specific interface element 460 may, e.g., be an object, interface, and/or other items that a particular user viewing view 40 may interact with, such as a menu of user-selectable options and/or actions for engaging the virtual space. Virtual space interface 400 may be configured to present information to the user viewing view 40 of the virtual space.

The avatars 410, 420 and/or 430 may represent a first user, a second user, and/or a third user, respectively within view 40. These users may be engaging with the virtual space and/or interacting with one another substantially simultaneously.

Avatar 410 may be visually associated with emblem 411, which may be visible to multiple users within the virtual space. Avatar 420 may be visually associated with emblem 421, which may be visible to multiple users within the virtual space. Avatar 430 may not be associated (or not yet be associated) with an emblem, or the emblem associated with avatar 430 may not be visible (yet) within view 40, and/or to other users within the virtual space.

Turning back to FIG. 1, in some implementations, server(s) 12 and client computing platforms 14 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 12 and/or client computing platforms 14 may be operatively linked in other ways.

A given client computing platform 14 may include one or more processors, and electronic display, a control interface, and/or other components. The one or more processors may be configured to execute computer program modules. The computer program modules may be configured to enable or user associated with the given client computing platform 14 to interface with system 10, and/or provide other functionality attributed herein to client computing platforms 14. For example, the computer program modules may include a view module configured to receive view information from server 12 (e.g., generated by virtual space module 22), and to present a view of the virtual space (e.g., as described above) based on the received view information. This may facilitate participation by the user of the given client computing platform 14 in the game taking place in the virtual space. By way of non-limiting example, the given client computing platform 14 may include one or more of a desktop computer, a laptop computer, a handheld computer, a tablet computing platform, a NetBook, a Smartphone, a gaming console, and/or other computing platforms.

The server 12 may include electronic storage 50, one or more processors 20, and/or other components. The server 12 may include communication lines, or ports to enable the exchange of information with a network and/or other computing platforms. Illustration of server 12 in FIG. 1 is not intended to be limiting. The server 12 may include a plurality of hardware, software, and/or firmware components operating together to provide the functionality attributed herein to server 12. For example, server 12 may be implemented "in the cloud" by a plurality of computing platforms operating together as server 12.

Electronic storage 50 may comprise electronic storage media that electronically stores information. The electronic storage media of electronic storage 50 may include one or both of system storage that is provided integrally (i.e., substantially non-removable) with server 50 and/or removable storage that is removably connectable to server 50 via, for example, a port (e.g., a USB port, a firewire port, etc.) or a drive (e.g., a disk drive, etc.). Electronic storage 50 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 50 may include one or more virtual storage resources (e.g., cloud storage, a virtual private network, and/or other virtual storage resources). Electronic storage 50 may store software algorithms, information determined by processor 20, information received from server 12, information received from client computing platforms 14, and/or other information that enables server 12 to function as described herein.

Processor(s) 20 is configured to provide information processing capabilities in server 12. As such, processor 20 may include one or more of a digital processor, an analog processor, a digital circuit designed to process information, an analog circuit designed to process information, a state machine, and/or other mechanisms for electronically processing information. Although processor 20 may be shown in FIG. 1 as a single entity, this is for illustrative purposes only. In some implementations, processor 20 may include a plurality of processing units. These processing units may be physically located within the same device, or processor 20 may represent processing functionality of a plurality of devices operating in coordination. The processor 20 may be configured to execute modules 22, 23, 24, 25, 26, and/or 27 by software; hardware; firmware; some combination of software, hardware, and/or firmware; and/or other mechanisms for configuring processing capabilities on processor 20.

It should be appreciated that although modules 22, 23, 24, 25, 26, and/or 27 are illustrated in FIG. 1 as being co-located within a single processing unit, in implementations in which processor 20 includes multiple processing units, one or more of modules 22, 23, 24, 25, 26, and/or 27 may be located remotely from the other modules. As a non-limiting example, some or all of the functionality attributed to modules 22, 23, 24, 25, 26, and/or 27 may be provided "in the cloud" by a plurality of processors connected through a network. The description of the functionality provided by the different modules 22, 23, 24, 25, 26, and/or 27 herein is for illustrative purposes, and is not intended to be limiting, as any of modules 22, 23, 24, 25, 26, and/or 27 may provide more or less functionality than is described. For example, one or more of modules 22, 23, 24, 25, 26, and/or 27 may be eliminated, and some or all of its functionality may be provided by other ones of modules 22, 23, 24, 25, 26, and/or 27. As another example, processor 20 may be configured to execute one or more additional modules that may perform some or all of the functionality attributed below to one of modules 22, 23, 24, 25, 26, and/or 27.

Figure 5:
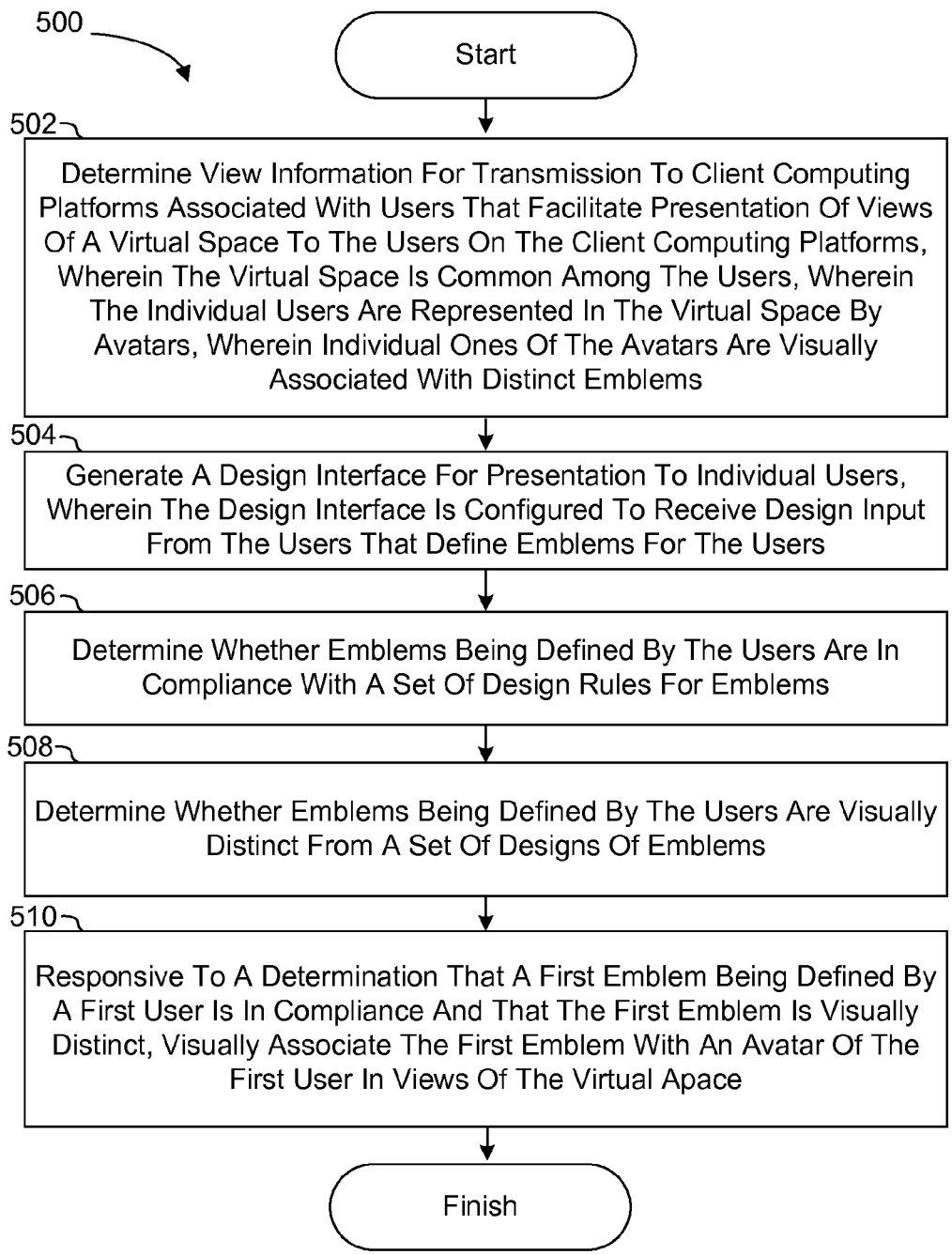
FIGS. 5-7 illustrate methods of guiding the design of emblems for users in a virtual space.

FIG. 5 illustrates a method 500 of guiding the design of an emblem by a user in a virtual space. The operations of method 500 presented below are intended to be illustrative. In some implementations, method 500 may be accomplished with one or more additional operations not described, and/or without one or more of the operations discussed. Additionally, the order in which the operations of method 500 are illustrated in FIG. 5 and described below is not intended to be limiting.

In some implementations, method 500 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 500 in response to instructions stored electronically on an electronic storage medium. The one or more processing devices may include one or more devices configured through hardware, firmware, and/or software to be specifically designed for execution of one or more of the operations of method 500.

At an operation 502, view information is determined for transmission to client computing platforms, associated with users, that facilitate presentations of views of a virtual space to the users on the client computing platforms. Users may be represented within the views of the virtual space by avatars. The virtual space may be common among users. Individual ones of the avatars may be visually associated with distinct emblems. In some implementations, operation 502 may be performed by a virtual space module similar to or the same as virtual space module 22 (shown in FIG. 1 and described herein).

At an operation 504, a design interface is generated for presentation to individual users, wherein the design interface is configured to receive design inputs from the users that define emblems for the users. In some implementations, operation 504 may be performed by a design module similar to or the same as design module 26 (shown in FIG. 1 and described herein).

At an operation 506, a determination is made whether emblems being defined are in compliance with a set of design rules for emblems. In some implementations, operation 506 may be performed by a design rule module similar to or the same as design rule module 24 (shown in FIG. 1 and described herein).

At an operation 508, a determination is made whether emblems being defined are visually distinct from a set of designs of emblems. In some implementations, operation 508 may be performed by a distinctiveness module similar to or the same as distinctiveness module 25 (shown in FIG. 1 and described herein).

At an operation 510, responsive to a determination that a first emblem being defined is in compliance with the set of design rules, and responsive to a determination that the first emblems is visually distinct from a set of designs of emblems, the first emblem is visually associated with an avatar of the first user in views of the virtual space. In some implementations, operation 510 may be performed by a virtual space module similar to or the same as virtual space module 22 (shown in FIG. 1 and described herein).

Figure 6:
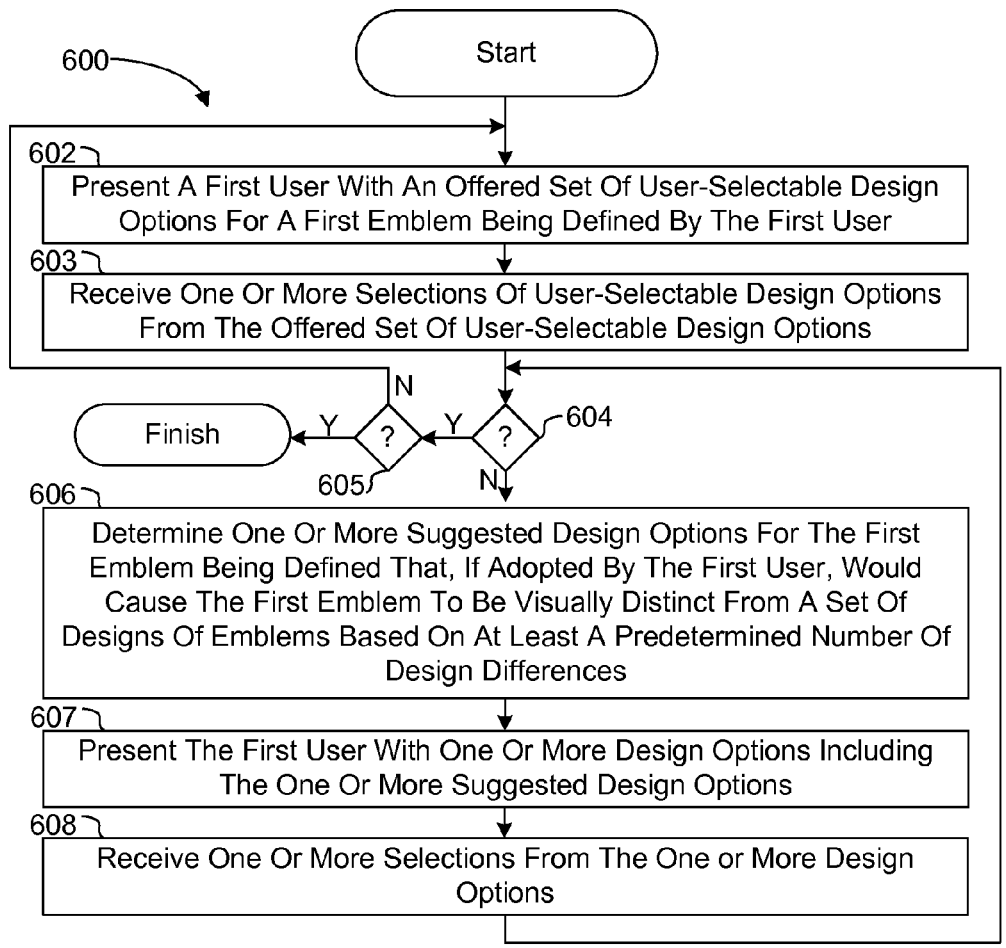

FIG. 6 illustrates method 600 of guiding the design of an emblem by a user in a virtual space. The operations of method 600 are intended to be illustrative. In some implementations, method 600 may be accomplished with one or more additional operations not described, and/or without one or more of the operations discussed. Additionally, the order in which the operations of method 600 are illustrated in FIG. 6 is not intended to be limiting.

At an operation 602, a first user of a virtual space is presented, e.g. through a design interface, with an offered set of user-selectable design options for the design of a first emblem begin defined by the first user, wherein view information that facilitates presentation of a view of the virtual space to the first user is transmitted to a client computing platform associated with the first user. Users may be represented within views of the virtual space by avatars. Individual ones of the avatars may be visually associated with an emblem, which may be designed through method 600. In some implementations, operation 602 may be performed by a design module similar to or the same as design module 26 (shown in FIG. 1 and described herein).

At an operation 603, one or more selections of user-selectable design options are received, selected by the user from the offered set of user-selectable design options. In some implementations, operation 603 may be performed by a design module similar to or the same as design module 26 (shown in FIG. 1 and described herein).

At an operation 604, a determination is made whether to proceed with operation 605 or operation 606. The determination at operation 604 is whether the first emblem being defined by the first user is visually distinct from a set of designs of emblems based on at least a predetermined number of design differences (with any of the designs in the set of designs). In some embodiments the predetermined number of required design differences is two. If so, method 600 proceeds with operation 605. If not, method 600 proceeds with operation 606. In some implementations, operation 604 may be performed by a distinctiveness module similar to or the same as distinctiveness module 25 (shown in FIG. 1 and described herein).

At an operation 606, one or more suggested design options are determined for the first emblem being defined that, if adopted by the first user, would cause the first emblem to be visually distinct from a set of designs of emblems based on at least a predetermined number of design differences. In some implementations, operation 606 may be performed by a distinctiveness module similar to or the same as distinctiveness module 25 (shown in FIG. 1 and described herein).

At an operation 607, the first user is presented with one or more design options including the one or more suggested design options. In some implementations, operation 607 may be performed by a design module similar to or the same as design module 26 (shown in FIG. 1 and described herein).

At an operation 608, one or more selections from the one or more presented design options are received from the first user. In some implementations, operation 608 may be performed by a design module similar to or the same as design module 26 (shown in FIG. 1 and described herein). Method 600 proceeds at operation 604.

At an operation 605, a determination is made whether to proceed with operation 602 or finish method 600. The determination at operation 605 is whether the first user accepts the first emblem being defined by the first user in its current state. If so, method 600 is finished. If not, method 600 proceeds with operation 602. In some implementations, operation 605 may be performed by a design module similar to or the same as design module 26 (shown in FIG. 1 and described herein).

Figure 7:
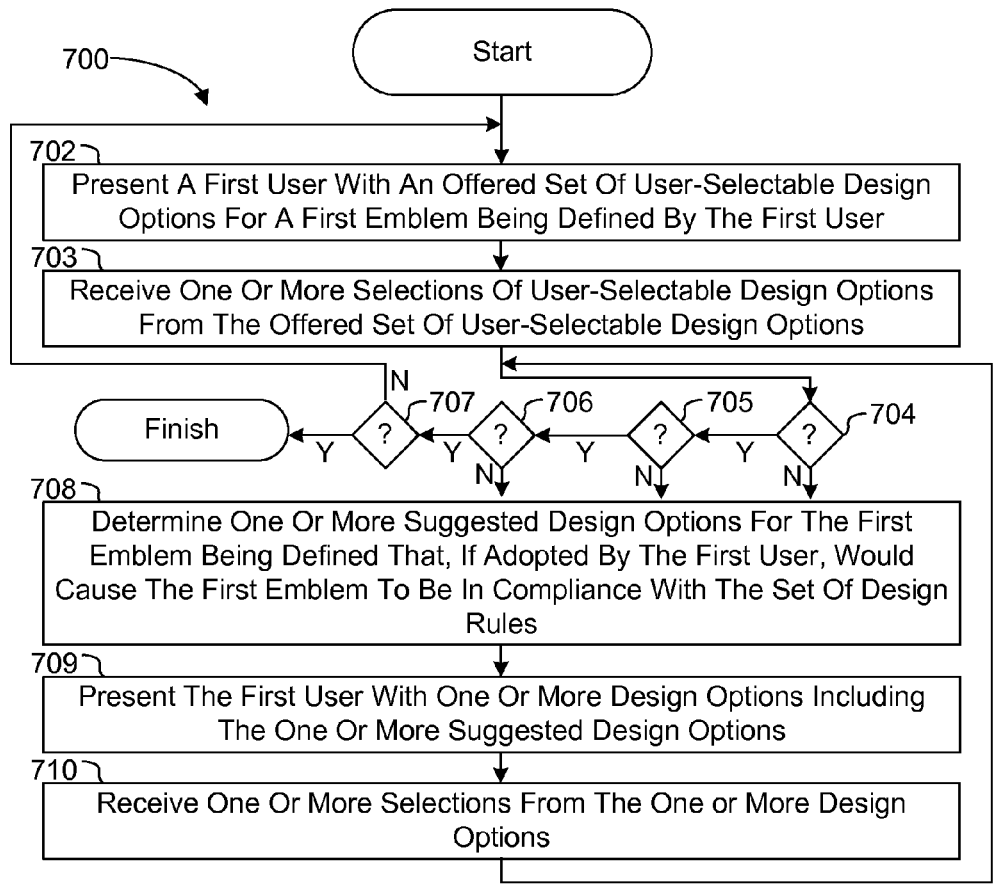

FIG. 7 illustrates method 700 of guiding the design of an emblem by a user in a virtual space. The operations of method 700 are intended to be illustrative. In some implementations, method 700 may be accomplished with one or more additional operations not described, and/or without one or more of the operations discussed. Additionally, the order in which the operations of method 700 are illustrated in FIG. 7 is not intended to be limiting.

At an operation 702, a first user of a virtual space is presented, e.g. through a design interface, with an offered set of user-selectable design options for the design of a first emblem begin defined by the first user, wherein view information that facilitates presentation of a view of the virtual space to the first user is transmitted to a client computing platform associated with the first user. Users may be represented within views of the virtual space by avatars. Individual ones of the avatars may be visually associated with an emblem, which may be designed through method 700. In some implementations, operation 702 may be performed by a design module similar to or the same as design module 26 (shown in FIG. 1 and described herein).

At an operation 703, one or more selections of user-selectable design options are received, selected by the user from the offered set of user-selectable design options. In some implementations, operation 703 may be performed by a design module similar to or the same as design module 26 (shown in FIG. 1 and described herein).

At an operation 704, a determination is made whether to proceed with operation 705 or operation 708. The determination at operation 704 is whether the first emblem being defined by the first user is in compliance with design rules pertaining to color combinations. If so, method 700 proceeds with operation 705. If not, method 700 proceeds with operation 708. In some implementations, operation 704 may be performed by a design rule module similar to or the same as design rule module 24 (shown in FIG. 1 and described herein).

At an operation 705, a determination is made whether to proceed with operation 706 or operation 708. The determination at operation 705 is whether the first emblem being defined by the first user is in compliance with design rules pertaining to spatial arrangement of one or more objects included in the first emblem. If so, method 700 proceeds with operation 706. If not, method 700 proceeds with operation 708. In some implementations, operation 705 may be performed by a design rule module similar to or the same as design rule module 24 (shown in FIG. 1 and described herein).

At an operation 706, a determination is made whether to proceed with operation 707 or operation 708. The determination at operation 706 is whether the first emblem being defined by the first user is in compliance with design rules pertaining to one or more divisions of one or more components of the first emblem being defined. If so, method 700 proceeds with operation 707. If not, method 700 proceeds with operation 708. In some implementations, operation 706 may be performed by a design rule module similar to or the same as design rule module 24 (shown in FIG. 1 and described herein).

At an operation 708, one or more suggested design options are determined for the first emblem being defined that, if adopted by the first user, would cause the first emblem to be in compliance with the set of design rules. In some implementations, operation 708 may be performed by a design rule module similar to or the same as design rule module 24 (shown in FIG. 1 and described herein).

At an operation 709, the first user is presented with one or more design options including the one or more suggested design options. In some implementations, operation 709 may be performed by a design module similar to or the same as design module 26 (shown in FIG. 1 and described herein).

At an operation 710, one or more selections from the one or more presented design options are received from the first user. In some implementations, operation 710 may be performed by a design module similar to or the same as design module 26 (shown in FIG. 1 and described herein). Method 700 proceeds at operation 704.

At an operation 707, a determination is made whether to proceed with operation 702 or finish method 700. The determination at operation 707 is whether the first user accepts the first emblem being defined by the first user in its current state. If so, method 700 is finished. If not, method 700 proceeds with operation 702. In some implementations, operation 707 may be performed by a design module similar to or the same as design module 26 (shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system configured to guide the design of an emblem by a user in a virtual space, the system comprising:
   one or more processors configured to execute computer program modules comprising:
   a virtual space module configured to determine view information for transmissions to client computing platforms associated with users that facilitate presentation of views of a virtual space to the users on the client computing platforms, wherein the virtual space is common among the users, wherein individual users are represented in the virtual space by avatars, wherein individual ones of the avatars include one or more objects within the virtual space that represent a virtual character, wherein individual ones of the avatars are visually associated with distinct emblems, and wherein the virtual space module is configured to facilitate customization of individual ones of the avatars by individual ones of the users based on selections by the individual users;
   a design module configured to receive one or more selections selected from an offered set of user-selectable design options, the one or more selections being received from the users, wherein the one or more selections, responsive to selection, define emblems for the users;
   a design rule module configured to determine whether non-textual aspects of emblems being defined through the received selections from the users are in compliance with a set of design rules for non-textual aspects of emblems wherein the set of design rules facilitate identification of combinations of selections that are selectable from the offered set of user-selectable design options but are not in compliance with the set of design rules for non-textual aspects of emblems, wherein the set of design rules includes rules related to:
      (i) disallowed color combinations that are not in compliance with the set of design rules for non-textual aspects of emblems,
      (ii) disallowed combinations of selectable objects that are not in compliance with the set of design rules for non-textual aspects of emblems, and
      (iii) disallowed spatial arrangements of multiple objects that are not in compliance with the set of design rules for non-textual aspects of emblems; and
   a distinctiveness module configured to determine whether non-textual aspects of emblems being defined by the users via the design module are visually distinct from a set of designs of emblems;
   wherein the virtual space module is further configured such that, responsive to a determination by the distinctiveness module that non-textual aspects of a first emblem being defined by a first user via the design module are visually distinct, and responsive to a determination by the design rule module that non-textual aspects of the first emblem are in compliance, the first emblem is visually associated with an avatar of the first user in views of the virtual space such that the first emblem is entirely spatially distinct from the avatar of the first user.

2. The system of claim 1, wherein the design module is configured to generate a design interface for presentation to individual users on the client computing platforms, wherein the design interface for the first user comprises the offered set of user-selectable design options for the first emblem being defined by the first user, and wherein the design module is configured to receive the one or more selections through the design interface.

3. The system of claim 1, wherein the set of design rules include one or more rules related to one or more of:
   allowed color combinations that are in compliance with the set of design rules for non-textual aspects of emblems,
   allowed combinations of selectable objects that are in compliance with the set of design rules for non-textual aspects of emblems, and
   allowed spatial arrangements of multiple objects that are in compliance with the set of design rules for non-textual aspects of emblems.

4. The system of claim 2, further comprising a user account module configured to manage user accounts including account information of users, wherein individual user accounts are associated with individual users in the virtual space, and wherein individual ones of the avatars are based on the account information of an individual user account.

5. The system of claim 4, wherein the set of design rules include one or more rules based on one or both of account information of the first user and/or a theme of the virtual space.

6. The system of claim 4, wherein the offered set of design options is based on at least one of account information of the first user and a theme of the virtual space.

7. A system configured to guide the design of an emblem by a user in a virtual space, the system comprising:
   one or more processors configured to execute computer program modules comprising:
   a virtual space module configured to determine view information for transmissions to client computing platforms associated with users that facilitate presentation of views of a virtual space to the users on the client computing platforms, wherein the virtual space is common among the users, wherein individual users are represented in the virtual space by avatars, wherein individual ones of the avatars are visually associated with distinct emblems;
   a design module configured to receive one or more selections selected from an offered set of user-selectable design options, the one or more selections being received from the users, wherein the one or more selections, responsive to selection, define emblems for the users;
   a design rule module configured to determine whether non-textual aspects of emblems being defined through the received selections from the users are in compliance with a set of design rules for non-textual aspects of emblems, wherein the set of design rules facilitate identification of combinations of selections that are selectable from the offered set of user-selectable design options but are not in compliance with the set of design rules for non-textual aspects of emblems, wherein the set of design rules includes rules related to:
      (i) disallowed color combinations that are not in compliance with the set of design rules for non-textual aspects of emblems,
      (ii) disallowed combinations of selectable objects that are not in compliance with the set of design rules for non-textual aspects of emblems, and
      (iii) disallowed spatial arrangements of multiple objects that are not in compliance with the set of design rules for non-textual aspects of emblems; and
   a distinctiveness module configured to determine whether non-textual aspects of emblems being defined by the users via the design module are visually distinct from a set of designs of emblems based on at least a predetermined number of design differences, wherein the predetermined number is two or greater, wherein the virtual space module is further configured such that, responsive to a determination by the distinctiveness module that non-textual aspects of a first emblem being defined by a first user via the design module are visually distinct, and responsive to a determination by the design rule module that non-textual aspects of the first emblem are in compliance, the first emblem is visually associated with an avatar of the first user in views of the virtual space such that the first emblem is entirely spatially distinct from the avatar of the first user.

8. The system of claim 1, wherein the set of designs of emblems corresponds to emblems in a plurality of distinct virtual spaces.

9. The system of claim 8, wherein the virtual space module is further configured to implement the first emblem defined by the first user based on a theme of a virtual space.

10. The system of claim 1, wherein the design module is further configured to present an indicator to the first user, wherein the indicator indicates whether non-textual aspects of the first emblem being defined by the first user is determined to be visually distinct from the set of designs of emblems by the distinctiveness module.

11. The system of claim 1, wherein the design interface generated by the design module, responsive to a determination by the distinctiveness module that non-textual aspects of the first emblem being defined by the first user are not visually distinct, further comprises one or more suggested design options that, if adopted by the first user, would cause non-textual aspects of the first emblem to be visually distinct from the set of designs of emblems.

12. The system of claim 1, wherein visual association of the first emblem with the avatar of the first user in view of the virtual space is furthermore responsive to a determination that the first emblem being defined by the first user is determined to be inoffensive.

13. A computer-implemented method for guiding the design of an emblem by a user in a virtual space, the method being implemented in a computer system comprising one or more processors configured to execute computer program modules, the method comprising:
  determining view information for transmission to client computing platforms associated with users that facilitate presentation of views of a virtual space to the users on the client computing platforms, wherein the virtual space is common among the users, wherein individual users are represented in the virtual space by avatars, wherein individual ones of the avatars are visually associated with distinct emblems;
  facilitating customization of individual ones of the avatars by individual ones of the users based on selection by the individual users;
  generating a design interface for presentation to individual users, wherein the design interface is configured to receive one or more selections selected from an offered set of user-selectable design options, the one or more selections being received from the users, wherein the one or more selections, responsive to selection, define emblems for the users;
  determining whether non-textual aspects of emblems being defined through the received selections from the users are in compliance with a set of design rules for emblems, wherein the set of design rules facilitate identification of combinations of selections that are selectable from the offered set of user-selectable design options but are not in compliance with the set of design rules for non-textual aspects of emblems, wherein the set of design rules includes rules related to:
    (i) disallowed color combinations that are not in compliance with the set of design rules for non-textual aspects of emblems,
    (ii) disallowed combinations of selectable objects that are not in compliance with the set of design rules for non-textual aspects of emblems, and
    (iii) disallowed spatial arrangements of multiple objects that are not in compliance with the set of design rules for non-textual aspects of emblems;
  determining whether non-textual aspects of emblems being defined by the users are visually distinct from a set of designs of emblems; and
  responsive to a determination that non-textual aspects of a first emblem being defined by a first user are in compliance and that non-textual aspects of the first emblem are visually distinct, visually associating the first emblem with an avatar of the first user in views of the virtual space such that the first emblem is entirely spatially distinct from the avatar of the first user.

14. The method of claim 13, wherein the design interface generated for presentation to the first user comprises:
  the offered set of user-selectable design options for the emblems being defined by the first user.

15. The method of claim 13, wherein the set of design rules include one or more rules related to one or more of:
  allowed color combinations that are in compliance with the set of design rules for non-textual aspects of emblems,
  allowed combinations a set of selectable objects that are in compliance with the set of design rules for non-textual aspects of emblems, and
  allowed spatial arrangements of multiple objects that are in compliance with the set of design rules for non-textual aspects of emblems.

16. The method of claim 13, further comprising managing user accounts including account information of users, wherein individual user accounts are associated with individual users in the virtual space, and wherein individual ones of the avatars are based on the account information of an individual user account.

17. The method of claim 16, wherein the set of design rules include one or more rules based on one or both of account information of the first user and/or a theme of the virtual space.

18. The method of claim 16, wherein the offered set of design options is based on at least one of account information of the first user and a theme of the virtual space.

19. The method of claim 13, wherein determining whether non-textual aspects of emblems being defined by the users are visually distinct from a set of designs of emblems is based on at least a predetermined number of design differences, wherein the predetermined number is two or greater.

20. The method of claim 13, wherein the set of designs of emblems corresponds to emblems in a plurality of distinct virtual spaces.

21. The method of claim 13, wherein the virtual space module is further configured to implement the first emblem defined by the first user based on a theme of a virtual space.

22. The method of claim 13, further comprising:
  presenting an indicator to the first user, wherein the indicator indicates whether non-textual aspects of the first emblem being defined by the first user are determined to be visually distinct.

23. The method of claim 13, further comprising:
  responsive to a determination that non-textual aspects of the first emblem being defined by the first user are not visually distinct, presenting the first user with one or more suggested design options that, if adopted by the first user, would cause non-textual aspects of the first emblem to be visually distinct.

24. The method of claim 13, further comprising:
determining whether the first emblem being defined by the first user is inoffensive;
wherein visually associating the first emblem with the avatar of the first user in view of the virtual space is furthermore responsive to a determination that the first emblem being defined by the first user is inoffensive.

25. A computer-implemented method for defining emblems by users of a virtual space such that the emblems are visually distinct from a set of designs of emblems, wherein individual users are represented in the virtual space by avatars, wherein individual ones of the avatars are visually associated with distinct emblems, the method being implemented in a computer system comprising one or more processors configured to execute computer program modules, the method comprising:
facilitating customization of individual ones of the avatars for individual ones of the users based on selection by the individual users;
presenting a first user with an offered set of user-selectable design options for a first emblem being defined by the first user;
receiving one or more selections of user-selectable design options from the offered set of user-selectable design options;
determining whether non-textual aspects of emblems being defined through the received one or more selections from the first user are in compliance with a set of design rules for emblems, wherein the set of design rules facilitate identification of combinations of selections that are selectable from the offered set of user-selectable design options but are not in compliance with the set of design rules for non-textual aspects of emblems, wherein the set of design rules includes rules related to:
  (i) disallowed color combinations that are not in compliance with the set of design rules for non-textual aspects of emblems,
  (ii) disallowed combinations of selectable objects that are not in compliance with the set of design rules for non-textual aspects of emblems, and
  (iii) disallowed spatial arrangements of multiple objects that are not in compliance with the set of design rules for non-textual aspects of emblems;
determining whether non-textual aspects of the first emblem being defined by the first user are visually distinct from a set of designs of emblems based on at least a predetermined number of design differences;
responsive to a determination that the non-textual aspects of the first emblem being defined by the first user are not visually distinct from a set of designs of emblems based on at least a predetermined number of design differences, determining one or more suggested design options for the first emblem being defined that, if adopted by the first user, would cause the non-textual aspects of the first emblem to be visually distinct from a set of designs of emblems based on at least a predetermined number of design differences, wherein the predetermined number of design differences is at least two; and
presenting the first user with one or more design options including the one or more suggested design options for the first emblem being defined.

26. A computer-implemented method for defining emblems by users of a virtual space such that the emblems are in compliance with a set of design rules for emblems, wherein individual users are represented in the virtual space by avatars, wherein individual ones of the avatars are visually associated with distinct emblems, the method being implemented in a computer system comprising one or more processors configured to execute computer program modules, the method comprising:
facilitating customization of individual ones of the avatars for individual ones of the users based on selection by the individual users;
presenting a first user with an offered set of user-selectable design options for a first emblem being defined by the first user;
receiving one or more selections of user-selectable design options from the offered set of user-selectable design options;
determining whether non-textual aspects of the first emblem being defined by the first user are in compliance with a first set of design rules pertaining to color combinations, combinations of selectable objects, and spatial arrangements of multiple objects, wherein the first set of design rules facilitate identification of combinations of user-selectable design options that are selectable from the offered set of user-selectable design options but are not in compliance with the first set of design rules;
determining whether non-textual aspects of the first emblem being defined by the first user are in compliance with a second set of design rules pertaining to one or more divisions of one or more components of the first emblem being defined by the first user, wherein the second set of design rules facilitate identification of combinations of selections that are selectable from the offered set of user-selectable design options but are not in compliance with the second set of design rules;
responsive to one or more of a determination that non-textual aspects of the first emblem are:
  not in compliance with the first set of design rules, or
  not in compliance with the second set of design rules,
determining one or more suggested design options for the first emblem being defined that, if adopted by the first user, would cause non-textual aspects of the first emblem to be in compliance with the first and second set of design rules; and
presenting the first user with the one or more design options including the one or more suggested design options for the first emblem being defined.

27. The computer-implemented method of claim 26, further comprising:
determining whether the first emblem being defined by the first user is inoffensive;
responsive to a determination that the first emblem being defined by the first user is not inoffensive, determining one or more suggested inoffensiveness design options for the first emblem being defined that, if adopted by the first user, would cause the first emblem to be determined to be inoffensive;
presenting the first user with the one or more design options including the one or more suggested inoffensiveness design options for the first emblem being defined.

28. The system of claim 1, wherein the virtual space module is configured to visually associate the first emblem with the avatar of the first user such that the first emblem is presented as a separate visual field from the avatar of the first user within views of the virtual space.

29. The system of claim 1, wherein the virtual space module is configured to visually associate the first emblem with the avatar of the first user such that the first emblem does not occupy any virtual space that is occupied by the avatar of the first user within views of the virtual space.

* * * * *